(12) United States Patent
Roy et al.

(10) Patent No.: US 12,210,818 B2
(45) Date of Patent: Jan. 28, 2025

(54) SUPERVISED AND UNSUPERVISED MACHINE LEARNING TECHNIQUES FOR COMMUNICATION SUMMARIZATION

(71) Applicant: Optum, Inc., Minnetonka, MN (US)

(72) Inventors: Suman Roy, Bangalore (IN); Vijay Varma Malladi, Hyderabad (IN); Ayan Sengupta, Noida (IN)

(73) Assignee: OPTUM, INC., Minnetonka, MN (US)

( * ) Notice: Subject to any disclaimer, the term of this patent is extended or adjusted under 35 U.S.C. 154(b) by 303 days.

(21) Appl. No.: 17/734,655

(22) Filed: May 2, 2022

(65) Prior Publication Data

US 2023/0351099 A1 Nov. 2, 2023

(51) Int. Cl.
*G06F 40/166* (2020.01)
*G06F 40/30* (2020.01)
(Continued)

(52) U.S. Cl.
CPC .......... *G06F 40/166* (2020.01); *G06F 40/30* (2020.01); *G06F 40/40* (2020.01); *G06N 3/08* (2013.01)

(58) Field of Classification Search
CPC ........ G06F 40/166; G06F 40/30; G06F 40/40; G06N 3/08
See application file for complete search history.

(56) References Cited

U.S. PATENT DOCUMENTS 7,849,147 B2 12/2010 Rohall et al.
7,865,560 B2 1/2011 Rohall et al.
(Continued)

FOREIGN PATENT DOCUMENTS

WO 2020/048721 A1 3/2020

OTHER PUBLICATIONS

Barzilay, Regina et al. "Learning To Paraphrase: An Unsupervised Approach Using Multiple-Sequence Alignment," Proceedings of HLT/NAACL 2003, arXiv Preprint arXiv: cs/0304006v1 [cs.CL] Apr. 2, 2003, (8 pages), available online at https://arxiv.org/pdf/cs/0304006.pdf.

(Continued)

*Primary Examiner* — Daniel C Washburn
*Assistant Examiner* — Athar N Pasha
(74) *Attorney, Agent, or Firm* — Alston & Bird LLP

(57) ABSTRACT

Various embodiments provide for summarization of an interaction, conversation, encounter, and/or the like in at least an abstractive manner. In one example embodiment, a method is provided. The method includes generating, using an encoder-decoder machine learning model, a party-agnostic representation data object for each utterance data object. The method further includes generating an attention graph data object to represent semantic and party-wise relationships between a plurality of utterance data objects. The method further includes modifying, using the attention graph data object, the party-agnostic representation data object for each utterance data object to form a party-wise representation data object for each utterance data object. The method further includes selecting a subset of party-wise representation data objects for each of a plurality of parties. The method further includes decoding, using the encoder-decoder machine learning model, the subset of party-wise representation data objects for each party to form abstractive summary data object(s).

20 Claims, 9 Drawing Sheets

(51) Int. Cl.
*G06F 40/40* (2020.01)
*G06N 3/08* (2023.01)

(56) References Cited

U.S. PATENT DOCUMENTS

| | | | |
|---|---|---|---|
| 9,116,984 | B2 | 8/2015 | Caldwell et al. |
| 10,783,314 | B2 | 9/2020 | Dernoncourt et al. |
| 11,018,885 | B2 | 5/2021 | Niekrasz |
| 2018/0233139 | A1* | 8/2018 | Finkelstein ............. G10L 25/51 |
| 2019/0287012 | A1 | 9/2019 | Celikyilmaz et al. |
| 2019/0318725 | A1* | 10/2019 | Le Roux ................. G10L 15/16 |
| 2020/0019614 | A1* | 1/2020 | Kumar .................. H04L 67/561 |
| 2020/0279074 | A1 | 9/2020 | Shires et al. |
| 2021/0149933 | A1* | 5/2021 | Chang ..................... G06F 16/35 |
| 2021/0327460 | A1 | 10/2021 | Qian et al. |
| 2021/0343273 | A1* | 11/2021 | Tripathi ................ G10L 15/063 |
| 2021/0375289 | A1 | 12/2021 | Zhu et al. |
| 2023/0035155 | A1* | 2/2023 | Huang ................... G06F 40/169 |
| 2023/0298565 | A1* | 9/2023 | Rosenberg ............ G10L 21/003 704/235 |

OTHER PUBLICATIONS

Baziotis, Christos et al. "SEQ3: Differentiable Sequence-to-Sequence-to-Sequence Autoencoder for Unsupervised Abstractive Sentence Compression," arXiv Preprint arXiv: 1904.03651v2 [cs.CL] Jun. 9, 2019, (9 pages), available online at https://arxiv.org/pdf/1904.03651.pdf.

Favre, Benoit et al. "Call Centre Conversation Summarization: A Pilot Task at Multiling 2015," In Proceedings of the 16th Annual Meeting of the Special Interest Group on Discourse and Dialogue SIGDIAL 2015 Conference, Sep. 2-4, 2015, pp. 232-236.

Filippovo, Katja, "Multi-Sentence Compression: Finding Shortest Paths in Word Graphs," In Proceedings of the 23rd International Conference On Computational Linguistics (Coling 2010), Aug. 2010, pp. 322-330.

Fu, Xiyan et al. "RepSum: Unsupervised Dialogue Summarization based on Replacement Strategy," In Proceedings of the 59th Annual Meeting of the Association for Computational Linguistics and the 11th International Joint Conference on Natural Language Processing, Aug. 1-6, 2021, pp. 6042-6051.

Goo, Chih-Wen et al. "Abstractive Dialogue Summarization with Sentence-Gated Modeling Optimized by Dialogue Acts," arXiv Preprint arXiv: 1809.05715v2 [cs.CL] Sep. 29, 2018 (8 pages), available online at https://arxiv.org/pdf/1809.05715.pdf.

Jang, Eric et al. "Categorical Reparameterization with Gumbel-Softmax," arXiv Preprint arXiv: 1611.01144v5 [stat.ML] Aug. 5, 2017, pp. 1-13, available online at https://arxiv.org/pdf/1611.01144.pdf%20http://arxiv.org/abs/1611.01144.pdf.

Maddison, Chris J. et al. "The Concrete Distribution: A Continuous Relaxation of Discrete Random Variables," arXiv Preprint arXiv: 1611.00712v3 [cs.LG] Mar. 5, 2017, pp. 1-20, available online at https://arxiv.org/pdf/1611.00712.pdf.

Nihei, Fumio et al. "Exploring Methods for Predicting Important Utterances Contributing to Meeting Summarization," Multimodal Technologies and Interaction, vol. 3, No. 3, Jul. 6, 2019, pp. 1-36, DOI: 10.3390/mti3030050.

Shang, Guokan et al. "Unsupervised Abstractive Meeting Summarization with Multi-Sentence Compression and Budgeted Submodular Maximization," arXiv Preprint arXiv: 1805.05271v2 [cs.CL] Nov. 14, 2018, (15 pages), available online at https://arxiv.org/pdf/1805.05271.pdf.

Steinberger, Josef et al. "Evaluation Measures for Text Summarization," Computing and Informatics, vol. 28, No. 2, Mar. 2, 2009, pp. 1001-1025.

Tixier, Antoine J.-P. et al. "GoWvis: A Web Application for Graph-of-Words-Based Text Visualization and Summarization," Proceedings of the 54th Annual Meeting of the Association for Computational Linguistics-System Demonstrations, Aug. 7-12, 2016, pp. 151-156.

Tur, Gokhan et al. "Unsupervised Language Model Adaptation for Meeting Recognition," In 2007 IEEE International Conference on Acoustics, Speech and Signal Processing—ICASSP'07, vol. 4, pp. Apr. 15, 2007, IV-173-IV-176.

Zhang, Xingxing et al. "HIBERT: Document Level Pre-training of Hierarchical Bidirectional Transformers for Document Summarization," arXiv Preprint arXiv: 1905.06566v1 [cs.CL] May 16, 2019, (11 pages), available online at https://arxiv.org/pdf/1905.06566.pdf.

Zhang, Xinyuan et al. "Unsupervised Abstractive Dialogue Summarization for Tete-a-Tetes," The Thirty-Fifth Association for the Advancement of Artificial Intelligence Conference on Artificial Intelligence (AAAI-21), vol. 35, No. 16, May 18, 2021, pp. 14489-14497.

\* cited by examiner

Utterance Text Data 400

A: this is Reynell speaking
B: hi Reynell good afternoon
A: how is it going today ma'am
B: good I apologize for talking softly I have a baby sleeping on top of me so hopefully you can hear me okay
A: not a problem
B: let me know if you can't hear \laughter
B: I'm I'm calling I had given birth in late October to my son and he was born six weeks early so he was inside the neonatal intensive care unit and I have just received a letter from the hospital that my son was born at saying that I needed to contact my insurance to update the coordination of benefits
B: as my as my claim is put into pended status as they are investigating the existence of other insurance coverage
A: I see that
B: so if I and so I don't know if there is anything that I need to do on my end
A: sure
B: please do notify me I may be charged for two hundred and forty thousand dollars \laughter and I am like
A: don't worry I will just I'll recheck. we can take care of this with one quick easy question
B: so
A: does do you have any other insurance primary to United Healthcare
B: no no just United Healthcare
A: and that takes care of it I've automatically updated that information and all claims pending for C. O. B. ehhh go back for reprocessing now okay
B: okay perfect see and then ummm I guess yeah I guess I guess that's it thank you so much Reynell I appreciate it
A: no problem and congratulations to and you family ma'am okay

FIG. 4A

Abstractive Summary Data Object 410
(Party B)

My son was born six weeks early so he was inside the neonatal intensive care unit and I have just received a letter from the hospital that I needed to contact my insurance to update the coordination of benefits.

Abstractive Summary Data Object 410
(Party A)

I've automatically updated information and all claims that are pending will be re-processed.

FIG. 4B

SUPERVISED AND UNSUPERVISED MACHINE LEARNING TECHNIQUES FOR COMMUNICATION SUMMARIZATION

BACKGROUND

Various embodiments of the present disclosure address technical challenges related to summarization of linguistic interactions, conversations, encounters, and/or the like, such as in the form of text data.

BRIEF SUMMARY

In general, embodiments of the present disclosure provide methods, apparatus, systems, computing devices, computing entities, and/or the like for summarizing an interaction, a conversation, an encounter, and/or the like that includes a plurality of utterances associated with a plurality of parties. In various embodiments, the utterances may be summarized in at least an abstractive manner; that is, various embodiments of the present disclosure include generating one or more abstractive summarizations of the utterances. In particular, an abstractive summarization may condense and paraphrase the utterances and may not be necessarily tied or reduced to the particular language of the plurality of utterances. As such, abstractive summarizations generated in accordance with various embodiments described herein may be more length- or size-efficient, more readable, and/or more adaptive or configurable compared to extractive summarizations, for example. Further, various embodiments are configured for generation of abstractive summarizations while minimizing a significant loss of or a significant departure from the original information content of the utterances.

In various embodiments, an abstractive summarization is generated using at least an encoder-decoder machine learning model and an attention graph data object. The encoder-decoder machine learning model may be configured and trained to generate representations and encodings each utterance. The attention graph data object may be configured to represent semantic and/or party-wise (e.g., cross-party) relationships between utterances. For example, portions of the attention graph data object may represent a question-and-answer relationship between two given utterances associated with two different parties. Using the encoder-decoder machine learning model and the attention graph data object, utterances can be encoded into representations that capture both internal meaning and holistic relationships of each utterance, and select representations can then be decoded to form abstractive summarizations that retain significant information captured in the original utterances.

In accordance with one aspect, a computer-implemented method for summarization of a plurality of utterance data objects each associated with one party of a plurality of parties is provided. The computer-implemented method may include generating, using an encoder-decoder machine learning model, a party-agnostic representation data object for each utterance data object of the plurality of utterance data objects. The computer-implemented method may further include generating an attention graph data object to represent semantic relationships between the plurality of utterance data objects. The computer-implemented method may further include modifying, using the attention graph data object, the party-agnostic representation data object for each utterance data object to form a party-wise representation data object for each utterance data object. The party-wise representation data object describes semantic relationship data associated with the utterance data object as determined based at least in part on the attention graph data object. The computer-implemented method may further include selecting a subset of party-wise representation data objects for each party of the plurality of parties. The computer-implemented method may further include decoding, using the encoder-decoder machine learning model, the subset of party-wise representation data objects for each party to form an abstractive summary data object for each party. The computer-implemented method may further include performing one or more automated actions based at least in part on the abstractive summary data object for each party.

In accordance with another aspect, a computer program product is provided. The computer program product may include at least one computer-readable storage medium having computer-readable program code portions stored therein, the computer-readable program code portions including executable portions configured to cause at least one processor to generate, using an encoder-decoder machine learning model, a party-agnostic representation data object for each utterance data object of the plurality of utterance data objects. The computer-readable program code portions may include executable portions further configured to cause at least one processor to generate an attention graph data object to represent semantic relationships between the plurality of utterance data objects. The computer-readable program code portions may include executable portions further configured to cause at least one processor to modify, using the attention graph data object, the party-agnostic representation data object for each utterance data object to form a party-wise representation data object for each utterance data object. The party-wise representation data object describes semantic relationship data associated with the utterance data object as determined based at least in part on the attention graph data object. The computer-readable program code portions may include executable portions further configured to cause at least one processor to select a subset of party-wise representation data objects for each party of the plurality of parties. The computer-readable program code portions may include executable portions further configured to cause at least one processor to decode, using the encoder-decoder machine learning model, the subset of party-wise representation data objects for each party to form an abstractive summary data object for each party. The computer-readable program code portions may include executable portions further configured to cause at least one processor to perform one or more automated actions based at least in part on the abstractive summary data object for each party.

In accordance with yet another aspect, an apparatus including a processor and at least one memory including computer program code is provided. The at least one memory and the computer program code may be configured to, with the processor, cause the apparatus to generate, using an encoder-decoder machine learning model, a party-agnostic representation data object for each utterance data object of the plurality of utterance data objects. The at least one memory and the computer program code may be further configured to, with the processor, cause the apparatus to generate an attention graph data object to represent semantic relationships between the plurality of utterance data objects. The at least one memory and the computer program code may be further configured to, with the processor, cause the apparatus to modify, using the attention graph data object, the party-agnostic representation data object for each utterance data object to form a party-wise representation data object for each utterance data object. The party-wise representation data object describes semantic relationship data associated with the utterance data object as determined based at least in part on the attention graph data object. The at least one memory and the computer program code may be further configured to, with the processor, cause the apparatus to select a subset of party-wise representation data objects for each party of the plurality of parties. The at least one memory and the computer program code may be further configured to, with the processor, cause the apparatus to decode, using the encoder-decoder machine learning model, the subset of party-wise representation data objects for each party to form an abstractive summary data object for each party. The at least one memory and the computer program code may be further configured to, with the processor, cause the apparatus to perform one or more automated actions based at least in part on the abstractive summary data object for each party.

BRIEF DESCRIPTION OF THE DRAWINGS

Having thus described the invention in general terms, reference will now be made to the accompanying drawings, which are not necessarily drawn to scale.

Figure 1:
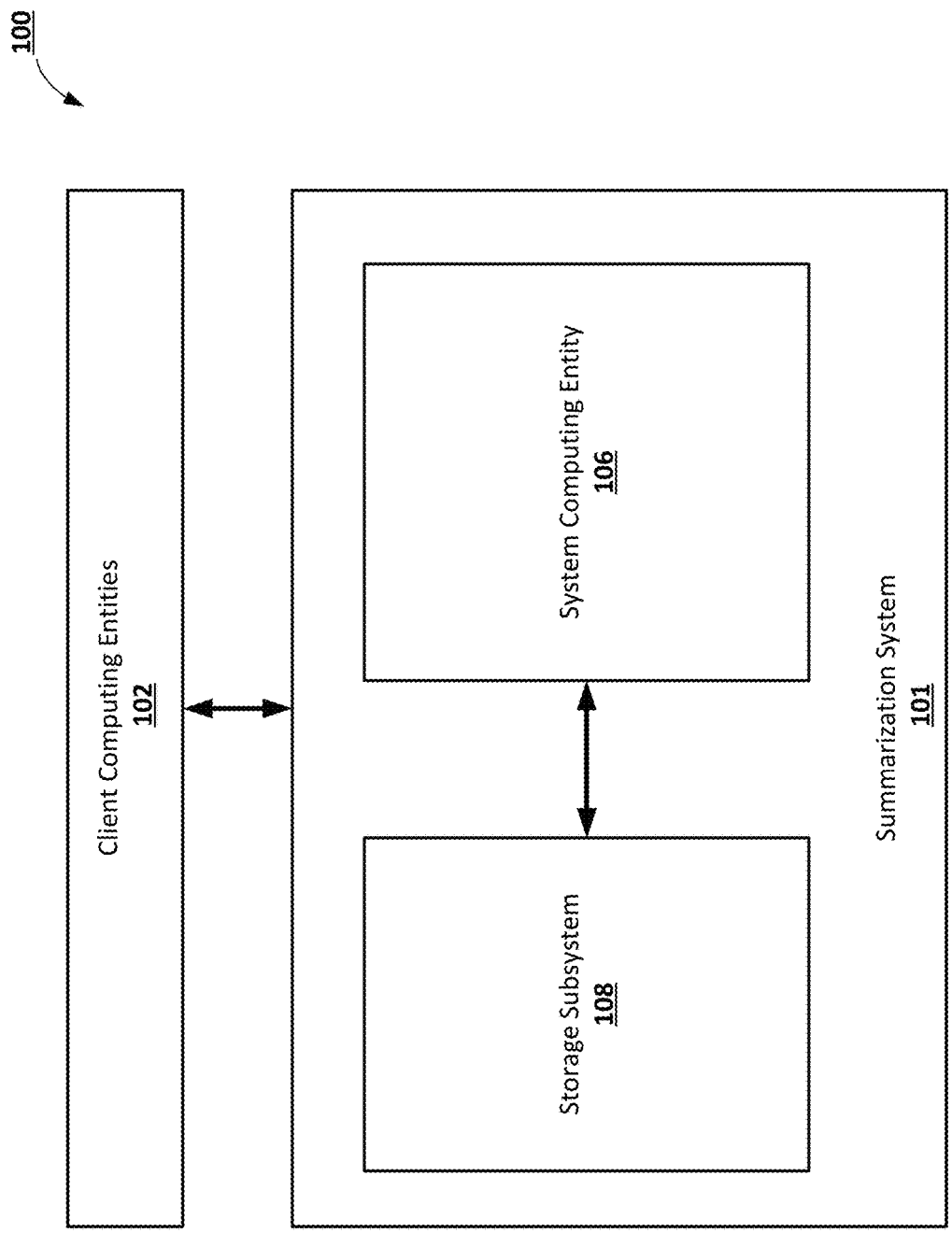

FIG. 1 provides an exemplary overview of an architecture that may be used to practice embodiments of the present disclosure.

Figure 2:
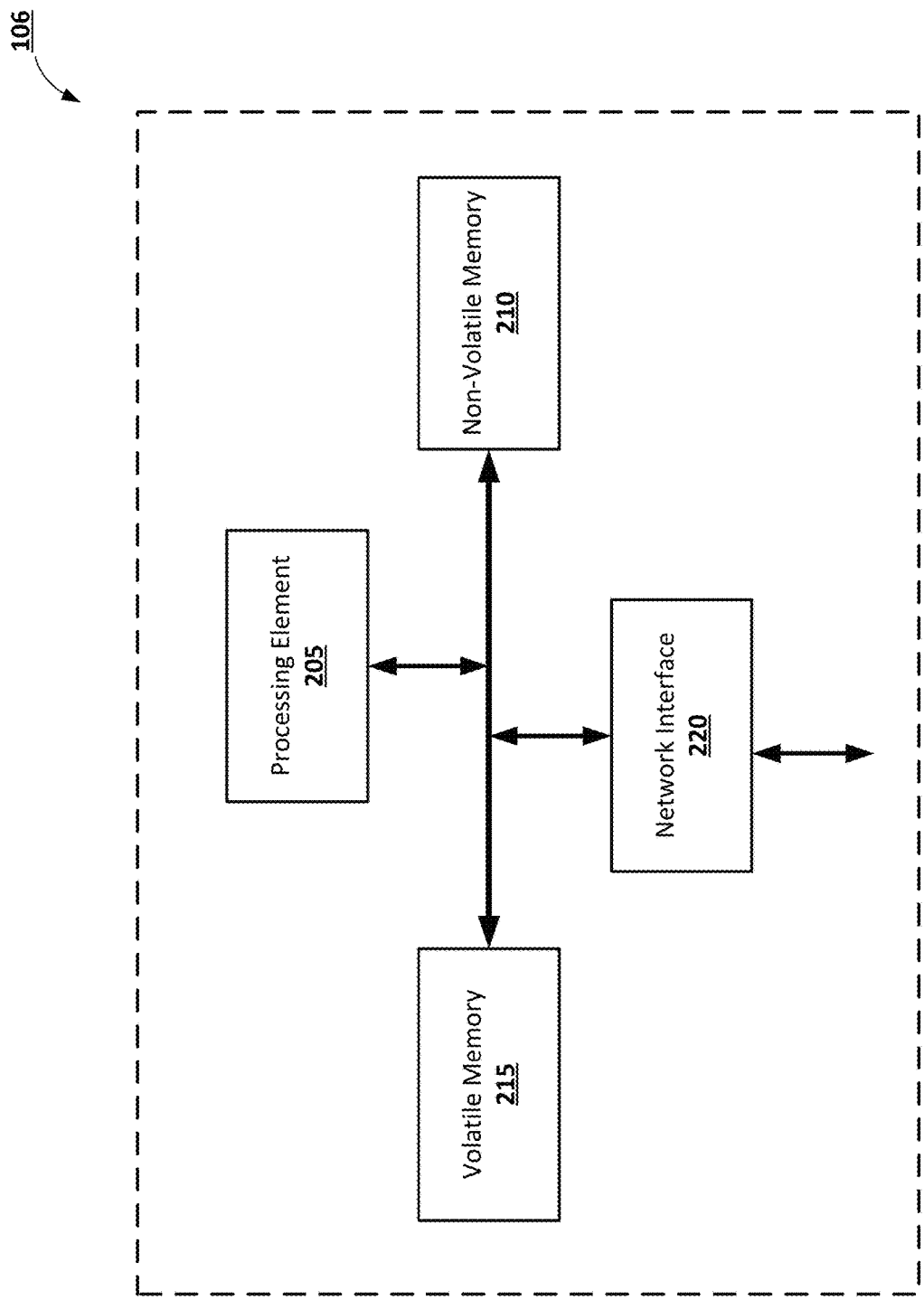

FIG. 2 provides a diagram of an example system computing entity, in accordance with some embodiments discussed herein.

Figure 3:
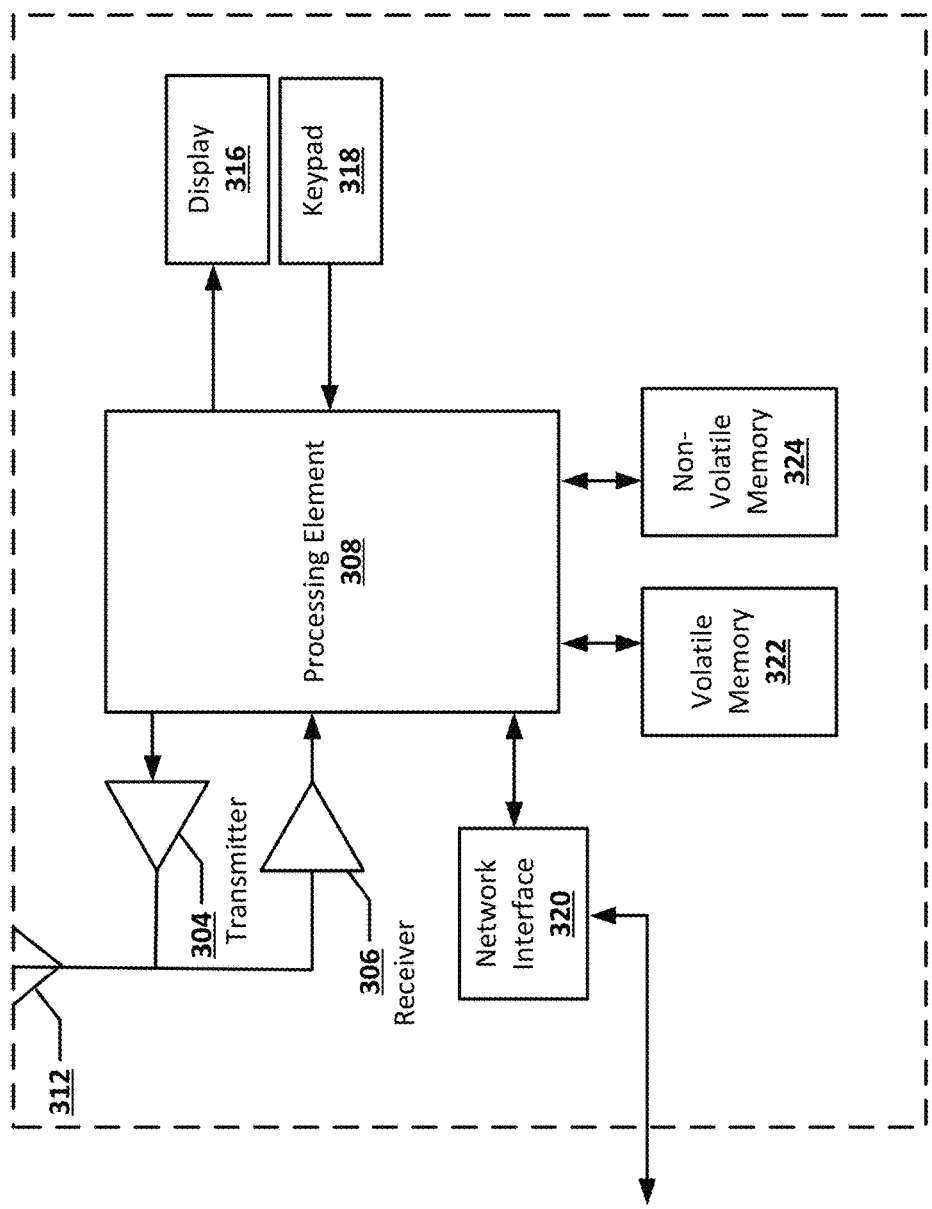

FIG. 3 provides a diagram of an example client computing entity, in accordance with some embodiments discussed herein.

FIG. 4A illustrates example text data for an interaction, conversation, encounter, and/or the like that may be summarized with one or more abstractive summaries, in accordance with various embodiments of the present disclosure.

FIG. 4B illustrates example abstractive summaries that are generated to summarize text data for an interaction, conversation, encounter, and/or the like, in accordance with various embodiments of the present disclosure.

Figure 4C:
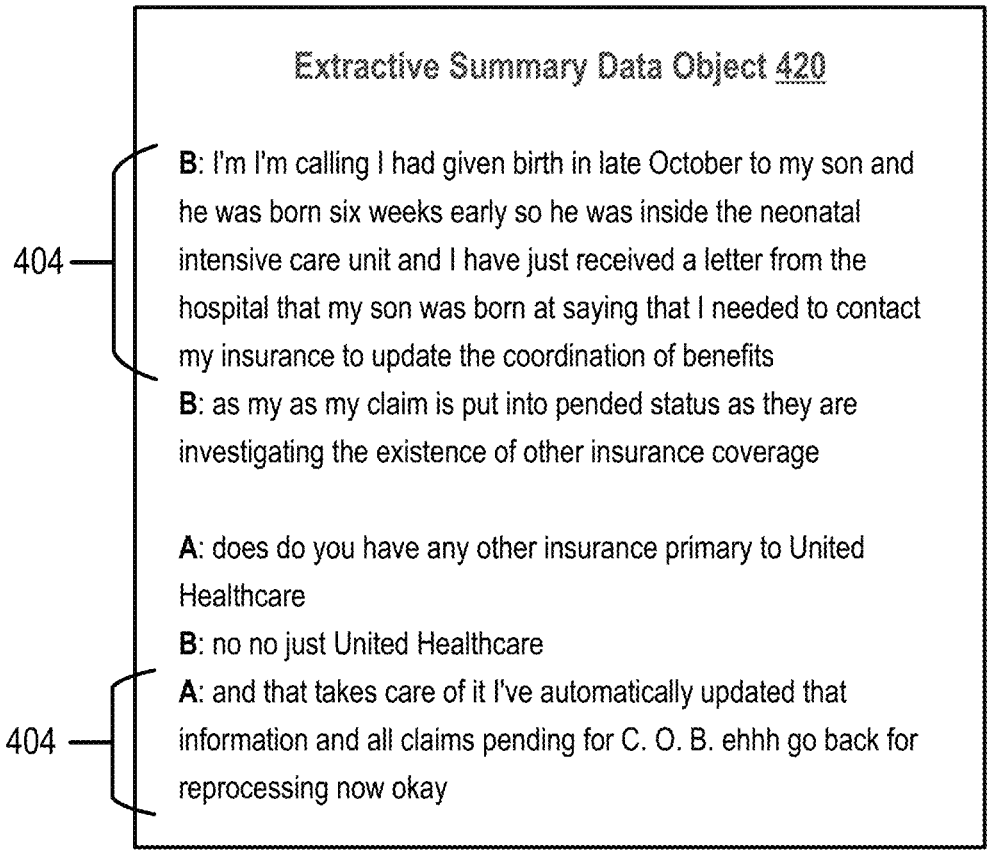

FIG. 4C illustrates an example extractive summary that may be generated to summarize text data for an interaction, conversation, encounter, and/or the like, in accordance with various embodiments of the present disclosure.

Figure 5:
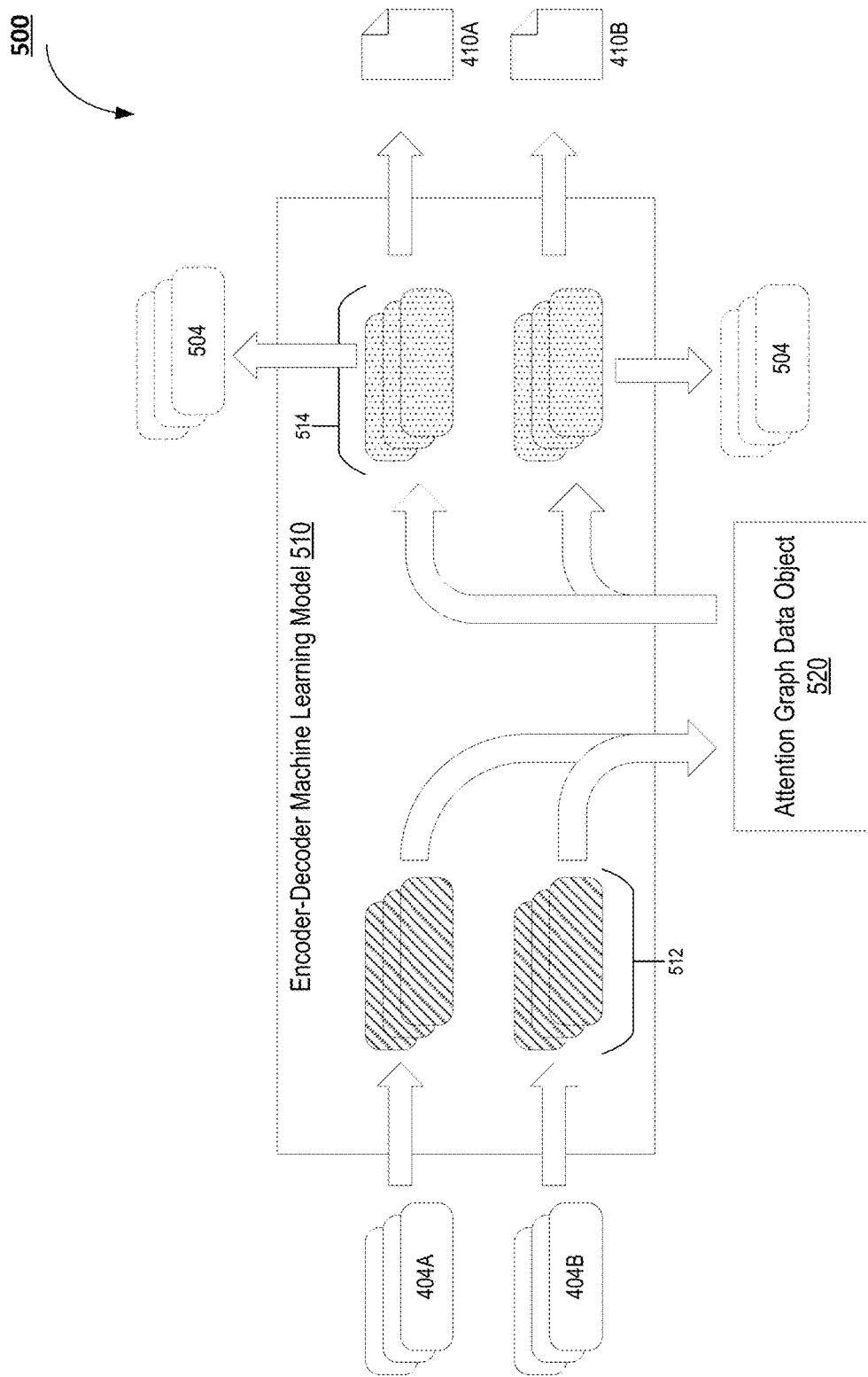

FIG. 5 provides a diagram illustrating generating one or more abstractive summary data objects for a plurality of utterance data objects using at least an encoder-decoder machine learning model and an attention graph data object, in accordance with various embodiments described herein.

Figure 6:
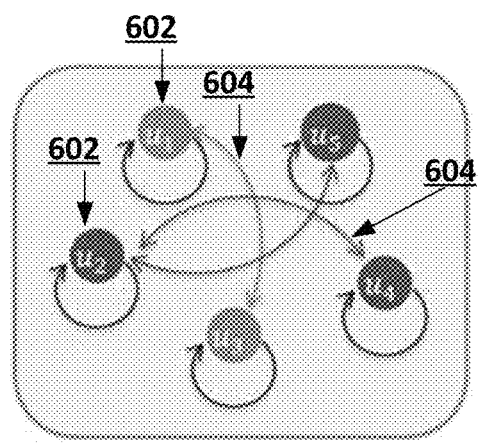

FIG. 6 provides a diagram illustrating an example attention graph data object used to generate abstractive summaries, in accordance with various embodiments described herein.

Figure 7:
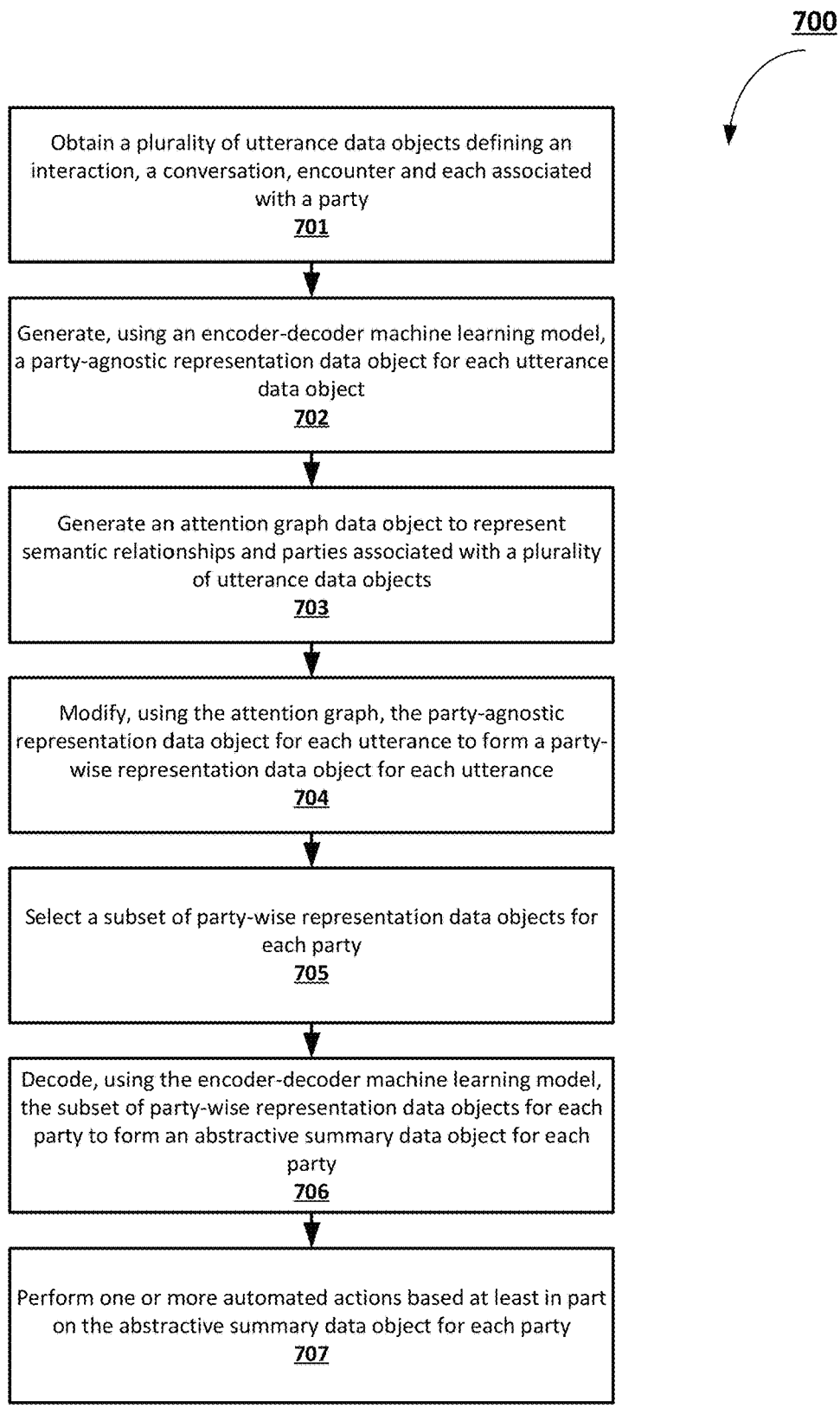

FIG. 7 illustrates a flowchart diagram of an example process for generating one or more abstractive summary data objects for a plurality of utterance data objects, in accordance with various embodiments discussed herein.

DETAILED DESCRIPTION

Various embodiments of the present disclosure now will be described more fully hereinafter with reference to the accompanying drawings, in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present disclosure are described with reference to providing text-based summarizations of conversations, one of ordinary skill in the art will recognize that the disclosed concepts can be used in other summarization and/or text extraction applications.

I. Overview and Technical Improvements

Various embodiments of the present invention address technical challenges associated with reducing operational load on document content retrieval server systems. For example, various embodiments of the present invention enable a document content retrieval server system to reduce the amount of content data associated with a document data object (e.g., an utterance data object) by summarizing the document data object, which in turn reduces the amount of content data that the document content retrieval server system transmits in response to document access requests. Accordingly, by providing techniques for reducing the amount of content data associated with a document data object by summarizing the document data object, various embodiments of the present invention address technical challenges associated with reducing operational load on document content retrieval server systems, and make important technical contributions to network architecture of document content retrieval server systems.

Various embodiments described herein are directed to summarizing an interaction, conversation, encounter, and/or the like that may be defined by a plurality of utterance data objects. In particular, various embodiments include generating one or more abstractive summary data objects for the plurality of utterance data objects, with the abstractive summary data objects featuring at least a significant amount of information found in the utterance data objects in a reduced-size format. In various embodiments, the abstractive summarizations provided by the generated abstractive summary data objects may be relatively unrestrained from the semantic and/or language content of the utterance data objects; abstractive summarizations may be adaptations of the utterance data objects. As such, various embodiments for generating abstractive summarizations provide technical solutions, improvements, and advantages at least with respect to existing summarization systems and techniques that produce extractive summarizations.

For example, with extractive summarizations including a number of portions directly extracted from the original text data (e.g., the utterance data objects) that are determined to holistically describe the original text data, abstractive summary data objects provide a solution that may require a reduced amount of data for storage, as such portions can be concisely adapted and paraphrased in the abstractive summary data objects. As a further result, processing and other actions using abstractive summary data objects as opposed to extractive summarizations may experience improved efficiency with a lower amount of data being processed (e.g., rendered for display, automatic response generation, profile data management).

Further, various embodiments may reduce the amount of operational resources dedicated to handling post-processing of summarizations such as extractive summarizations. For instance, extractive summarizations include text data directly extracted from the utterance data objects and as a result may retain typographical errors, translation errors, transcription errors, optical character recognition errors, and/or the like found in the utterance data objects. Post-processing operations may then be required to remove such errors from an extractive summarization. On the contrary, abstractive summarizations (e.g., abstractive summary data objects) are generated, in accordance with various embodiments described herein, via encoding and decoding representations and/or encodings of the utterance data objects, and in the encoding-decoding process—which embodies adapting and paraphrasing the utterance data objects—the number of errors found in the abstractive summarizations is reduced, thereby minimizing the amount of post-processing operations needed.

Accordingly, various embodiments of the present disclosure provide various technical improvement in summarization of interactions, conversations, encounters, and/or the like defined with a plurality of utterance data objects. As a further technical advantage, various embodiments described herein provide abstractive summarizations (e.g., abstractive summary data objects) with a minimized loss of or departure from original information content found in the plurality of utterance data objects. With respect to alternative abstractive summarization techniques, various embodiments improve content word overlapping between a generated abstractive summary data object and the utterance data objects that it summarizes, thus enabling domain knowledge included in the utterance data objects to be preserved and interpreted correctly within a summarization. Generally, abstractive summary data objects generated in semantic and/or content similarity with the utterance data objects; thus, various embodiments enable summarization of interactions, conversations, encounters, and/or the like with improved accuracy.

In providing more accurate abstractive summarizations (e.g., the abstractive summary data objects), various embodiments of the present disclosure include an encoder-decoder machine learning model and an attention graph data object that together enable a large amount of information present in the utterance data objects to be captured, encoded, and decoded into an abstractive summarization. In various embodiments, the attention graph data object is generated according to the utterance data objects and the parties associated therewith. The attention graph data object can be generated and optimized, using a graph neural network machine learning model for example, to represent semantic and party-wise relationships between the utterance data objects. The utterance data objects may be provided to the encoder-decoder machine learning model which generates representations of the utterance data objects, and the representations may incorporate the relationships of the utterance data objects represented by the attention graph data object. A subset of representations that are determined to be most significant (e.g., via an attention mechanism of the encoder-decoder machine learning model) is selected and decoded via the encoder-decoder machine learning model to generate one or more abstractive summary data objects. Thus, the abstractive summary data objects include decoded versions of the original utterance data objects that accurately capture the information content of the original utterance data objects.

In various embodiments, the encoder-decoder machine learning model may be configured and trained to encode and decode representations of utterance data objects via unsupervised and/or self-supervised learning. As a result, various embodiments may be used to summarize novel interactions, conversations, encounters, and/or the like accurately without requiring historical labeled data or training data. As understood, historical labeled data may be difficult to obtain or define for summarization tasks, as there may not be one "ground-truth" summarization for a plurality of utterance data objects. Thus, via unsupervised and/or self-supervised learning, various embodiments enable summarizations with accuracy and without requiring historical labeled data.

Various embodiments of the present invention make important technical contributions to improving resource-usage efficiency of post-prediction systems (e.g., summarization-based predictive data analysis systems that analyze summarization data) by using document (e.g., utterance) to set the number of allowed computing entities used by the noted post-prediction systems. For example, in some embodiments, a predictive data analysis computing entity determines D investigation classifications for D document data objects based at least in part on the D summarizations for the D document data objects. Then, the count of document data objects that are associated with an affirmative investigation classification, along with a resource utilization ratio for each document data object, can be used to predict a predicted number of computing entities needed to perform post-prediction processing operations (e.g., automated investigation operations) with respect to the D document data objects. For example, in some embodiments, the number of computing entities needed to perform post-prediction processing operations (e.g., automated investigation operations) with respect to D document data objects can be determined based at least in part on the output of the equation: $R=\text{ceil}(\Sigma_k^{k=K} ur_k)$, where R is the predicted number of computing entities needed to perform post-prediction processing operations with respect to the D document data object, $\text{ceil}(\cdot)$ is a ceiling function that returns the closest integer that is greater than or equal to the value provided as the input parameter of the ceiling function, k is an index variable that iterates over K document data objects among the D document data that are associated with affirmative investigative classifications, and $ur_k$ is the estimated resource utilization ratio for a kth document data object that may be determined based at least in part on a count of utterances/tokens/words in the kth document data object. In some embodiments, once R is generated, the predictive data analysis computing entity can use R to perform operational load balancing for a server system that is configured to perform post-prediction processing operations (e.g., automated investigation operations) with respect to D document data objects. This may be done by allocating computing entities to the post-prediction processing operations if the number of currently-allocated computing entities is below R, and deallocating currently-allocated computing entities if the number of currently-allocated computing entities is above R.

II. Exemplary Definitions of Certain Terms

The term "utterance data object" may refer to a data entity configured to describe an utterance that is spoken, received from, conveyed, input via user input, thought, and/or the like by a party or entity. An utterance data object may include text data that describes the utterance, and the text data may be transcribed, recognized, directly input or specified by the party or entity, and/or the like. For example, an utterance data object may be generated based at least in part on transcribing an auditory utterance, recognizing a written utterance, or processing and/or transforming an input utterance. In various examples, an utterance data object may describe an utterance that includes one or more words, which may be organized into one or more sentences An utterance data object may describe an utterance at a character-level. In various embodiments, an utterance data object may be a vector, a matrix, an array, embeddings, a data structure, and/or the like.

The term "attention graph data object" may refer to a data entity configured to represent a plurality of utterance data objects, semantic relationships between the plurality of utterance data objects, and parties associated with the utterance data objects. The attention graph data object comprises a graph data structure having a plurality of nodes and a plurality of edges, and each node may represent an utterance data object. Each edge may be associated with attention weights to represent semantic relationships between utterance data objects. In one illustrative example, an edge may be weighted more heavily to represent a direct correlation (e.g., a question-and-answer relationship) between two utterance data objects, compared to another edge connecting two relatively un-related utterance data objects. In various examples, the plurality of nodes may be labelled according to the party associated with, or uttering, the represented utterance data objects. Accordingly, an interaction, conversation, encounter, and/or the like, as well as its semantic and/or cross-party dynamics, can be represented by an attention graph data object. In various embodiments, an attention graph data object may be generated and optimized iteratively in order to accurately represent a plurality of utterances. For instance, the attention graph data object may be provided to a graph neural network machine learning model (e.g., a graph convolutional neural network) configured and trained to optimize and learn the attention weights of the attention graph data object. Using the attention graph data object (including its edges, attention weights, and node labels, for example), relationship and party information can be encoded into representations of utterances, enabling the generation of semantically accurate and informationally-complete abstractive summaries.

The term "encoder-decoder machine learning model" may refer to a data entity configured to generate one or more representations of an utterance data object and to decode a representation of an utterance data object. In various examples, the encoder-decoder machine learning model may include at least one encoder portion or module and at least one decoder portion or module. The encoder-decoder machine learning model, with its encoder portion for example, may be configured and trained to generate representations of an utterance data object that may encode information of the utterance data object. The encoder-decoder machine learning model, with its decoder portion for example, may be configured to decode a representation of an utterance data object to generate another utterance data object, or to "re-generate" the utterance data object. For example, the utterance data object generated from decoding a representation may be a prediction of the original utterance data object represented by the representation, and the prediction may be generated without knowledge of the original utterance data object. In some examples, the decoding function of the encoder-decoder machine learning model may be configured and trained to generate decoded utterance data objects in a particular form, such as in a third-person perspective. The at least one encoder portion or module and the at least one decoder portion or module may be trained together in an unsupervised and/or self-supervised manner, as described in the context of various embodiments of the present disclosure. In some embodiments, the inputs to an encoder-decoder machine learning model is a vector describing an utterance data object and the output of an encoder-decoder machine learning model is a vector describing a reconstructed/decoded an utterance data object.

The term "party-agnostic representation data object" may refer to a data entity that is configured to provide a representation of an utterance data object without necessarily relying upon knowledge of relationships of the utterance data object with other utterance data objects and/or other parties. The party-agnostic representation data object for an utterance data object may be generated by the encoder-decoder machine learning model, and specifically by an encoder portion or module of the encoder-decoder machine learning model. The party-agnostic representation data object may include an encoding of different portions within the utterance data object according to their relative importance as determined via a self-attention mechanism. The party-agnostic representation data may additionally or alternatively include an encoding of the utterance data object with respect to other utterance data objects, such as other utterance data objects associated with the same party, via a self-attention mechanism, for example.

The term "party-wise representation data object" may refer to a data entity that is configured to provide a representation of an utterance data object that incorporates knowledge of relationships of the utterance data object with other utterance data objects and/or other parties. The party-wise representation data object for an utterance data object may be generated from the party-agnostic representation data object for the utterance data object, and the knowledge of relationships for the utterance data object that is incorporated or encoded into the party-wise representation data object may be obtained from the attention graph data object. As such, the party-wise representation data object may include a contextual representation of the utterance data object with respect to a party dynamic context. The party-wise representation data object may follow the same or similar dimensions as the party-agnostic representation data object from which it is derived. As such, the party-wise representation data object may be configured to be decode by the encoder-decoder machine learning model. The party-wise representation data object may be a vector, a matrix, an array, embeddings, a data structure, and/or the like.

The term "reconstruction loss measure" may refer to a data entity configured to describe a similarity, or lack thereof, between a decoded version of a particular utterance data object as generated by the encoder-decoder machine learning model and an original "true" version of the particular utterance data object. Thus, the reconstruction loss measure may describe an accuracy (e.g., a semantic accuracy) in the encoding and/or decoding function of the encoder-decoder machine learning model. For instance, during training of the encoder-decoder machine learning model, a prediction of a particular utterance data object may be generated from representations (e.g., party-agnostic representation data objects, party-wise representation data objects) for the particular utterance data object and for related utterance data objects, such as the utterance data objects that sequentially precede the particular utterance data object. The accuracy of the prediction of the particular utterance data object can be described by the reconstruction loss measure. Accordingly, the reconstruction loss measure may be used to configure and train the encoding-decoding machine learning model, such that the encoding-decoding machine learning model can encode and decode with sufficient accuracy, in various examples.

The term "summarization loss measure" may refer to a data entity configured to describe a similarity, or lack thereof, between an abstractive summary and a plurality of utterances. That is, the summarization loss measure may describe the loss of information and content as the plurality of utterance is encoded and then decoded through the encoder-decoder machine learning model to form an abstractive summary. The summarization loss measure may be used to configure and train the encoding-decoding machine learning model, such as the encoding and decoding functions of the encoding-decoding machine learning model. Additionally or alternatively, the summarization loss measure may be used to configure and train an attention mechanism of the encoding-decoding machine learning model that selects significant party-wise representation data objects to decode to form an abstractive summary.

The term "abstractive summary data object" may refer to a data entity configured to describe an abstractive summarization for a plurality of utterances. An abstractive summary data object may include text data that concisely describes the plurality of utterances without necessarily being restricted to specific language found in the plurality of utterance data objects. In various embodiments, an abstractive summary data object may be generated for each party captured within the plurality of utterances (e.g., each party involved in the interaction, conversation, encounter, and/or the like). An abstractive summary data object may be generated based at least in part on decoding representations of certain utterance data objects, and the decoding can be configured and trained such that the abstractive summary data object can be pre-configured. For instance, the abstractive summary data object can be generated in a third-person form or perspective irrespective or a form or perspective of the plurality of utterance data objects. In various embodiments, the abstractive summary data object may be a vector, a matrix, an array, embeddings, a data structure, and/or the like.

The term "extractive summary data object" may refer to a data entity configured to describe an extractive summary for a plurality of utterances. An extractive summary data object may include text data that includes one or more selected utterances from the plurality of utterances that are determined to holistically describe the plurality of utterances. Accordingly, in various examples, the extractive summary data object may include text data explicitly extracted from the plurality of utterances or directly and closely derived from the plurality of utterances. In various embodiments, the abstractive summary data object may be a vector, a matrix, an array, embeddings, a data structure, and/or the like.

III. Computer Program Products, Methods, and Computing Entities

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Architecture

FIG. 1 is a schematic diagram of an example system architecture 100 for generating one or more abstractive summary data objects for a plurality of utterance data objects, with the abstractive summary data objects concisely and holistically describing the plurality of utterance data objects. An abstractive summary data object may include text data that is a paraphrasing of informationally significant portions of the plurality of utterance data objects. In some examples, the system architecture 100 may be used to obtain an abstractive summary data object for each party associated with the plurality of utterance data objects, such as for each person speaking in a conversation. Generally, the system architecture 100 generates a condensed amount of text data to describe an interaction, a conversation, an encounter, and/or the like involving a plurality of parties.

The system architecture 100 includes a summarization system 101 configured to summarize a plurality of utterance data objects for an interaction, a conversation, an encounter, and/or the like. The summarization system 101 may be configured to generate one or more abstractive summary data objects from the plurality of utterance data objects, and in some embodiments, the summarization system 101 may be configured to additionally generate one or more extractive summary data objects from the plurality of utterance data objects. That is, in some example embodiments, a plurality of utterance data objects may be summarized in an abstractive manner and/or an extractive manner.

As shown in FIG. 1, the summarization system 101 may be in communication with one or more client computing entities 102 and may provide summarization services for the one or more client computing entities 102. In one or more example scenarios, the summarization system 101 may receive a plurality of utterance data objects (e.g., a transcription of a call or a conversation) and may, in response, provide one or more abstractive summary data objects that concisely and holistically describe the plurality of utterance data objects. For example, the summarization system 101 may comprise one or more application programming interfaces (APIs) that a client computing entity 102 may query with the plurality of utterance data objects and through which the one or more abstractive summary data objects may be provided to the client computing entity 102 in response. However, it is to be understood that the summarization system 101 may otherwise provide abstractive summarization for utterance data objects irrespective of their origins, whether from a client computing entity 102 or from internally within the summarization system 101 or directly input (e.g., via a user) to the summarization system 101.

In some embodiments, the summarization system 101 may communicate with at least one of the client computing entities 102 using one or more communication networks. Examples of communication networks include any wired or wireless communication network including, for example, a wired or wireless local area network (LAN), personal area network (PAN), metropolitan area network (MAN), wide area network (WAN), one or more cellular communication networks (4G Long Term Evolution, 5G New Radio), and/or the like, as well as any hardware, software and/or firmware required to implement it (such as, e.g., network routers, and/or the like).

The summarization system 101 may include a system computing entity 106 and a storage subsystem 108. The system computing entity 106 may be configured to perform various operations described herein to summarize a plurality of utterance data objects in at least an abstractive manner by generating one or more abstractive summary data objects. In various embodiments, the system computing entity 106 may be configured to perform and/or execution operations to generate representations (e.g., party-agnostic representation data objects, party-wise representation data objects) for the plurality of utterance data objects, to process said representations, and to decode a select subset of the representations to form abstractive summary data objects. To generate and decode representations of utterance data objects, the system computing entity 106 may be configured to use an encoder-decoder machine learning model and an attention graph data object. In some example embodiments, the system computing entity 106 may be configured to configure and train the encoder-decoder machine learning model and to generate and optimize the attention graph data object.

In various embodiments, the system computing entity 106 may be a cloud-based computing system and comprises one or more computing devices each configured to share and allocate computer processing resources and data in order to recommend and/or define cross-schema mappings, in some examples. In other example embodiments, the system computing entity 106 may be a single computing device, one or more interconnected computing devices working together, a distributed computing system, one or more devices in an edge computing architecture, and/or the like.

The storage subsystem 108 may be configured to store certain data for summarizing a plurality of utterance data objects in at least an abstractive manner. For instance, in example embodiments, the storage subsystem 108 stores the encoder-decoder machine learning model and/or the attention graph data object used to generate and decode representations of the utterance data objects. As another non-limiting example, the plurality of utterance data objects that are summarized may be stored in and obtained, accessed, retrieved, and/or the like from the storage subsystem 108.

The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Computing Entities

In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

FIG. 2 provides a schematic of a system computing entity 106, according to one embodiment of the present disclosure. As shown in FIG. 2, in one embodiment, the system computing entity 106 may include, or be in communication with, one or more processing elements 205 (also referred to as processors, processing circuitry, and/or similar terms used herein interchangeably) that communicate with other elements within the system computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In one embodiment, the system computing entity 106 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media 210 may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity—relationship model, object model, document model, semantic model, graph model, and/or the like.

In one embodiment, the system computing entity 106 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media 215 may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the system computing entity 106 with the assistance of the processing element 205 and operating system.

As indicated, in one embodiment, the system computing entity 106 may also include one or more network interfaces 220 for communicating with various computing entities (e.g., one or more other system computing entities 106, one or more client computing entities 102), such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the system computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the system computing entity 106 may include, or be in communication with, one or more input elements, such as a keyboard input, a mouse input, a touch screen/display input, motion input, movement input, audio input, pointing device input, joystick input, keypad input, and/or the like. The system computing entity 106 may also include, or be in communication with, one or more output elements (not shown), such as audio output, video output, screen/display output, motion output, movement output, and/or the like.

FIG. 3 provides a schematic of an example client computing entity 102 that may be used in conjunction with embodiments of the present disclosure. Client computing entities 102 can be operated by various parties, and the system architecture 100 may include one or more client computing entities 102. Within the system architecture 100, client computing entities 102 may be and/or may be components of external systems that manage data in accordance with external schemas, and the client computing entities 102 may be configured to at least assist (e.g., by providing relevant information regarding an external schema) in recommendation or definition of cross-schema mappings such that the data managed by the external systems can be integrated in accordance with a canonical schema.

As shown in FIG. 3, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the system computing entity 106. In a particular embodiment, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the system computing entity 106 via a network interface 320.

Via these communication standards and protocols, the client computing entity 102 can communicate with various other entities (e.g., system computing entities 106, storage subsystem 108) using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like.

Alternatively, the location information/data can be determined by triangulating the client computing entity's 102 position in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the system computing entity 106, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the system computing entity 106, various other computing entities, and/or a storage subsystem 108.

In another embodiment, the client computing entity 102 may include one or more components or functionality that are the same or similar to those of the system computing entity 106, as described in greater detail above. As will be recognized, these architectures and descriptions are provided for exemplary purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. Exemplary System Operations

As described below, various embodiments of the present invention address technical challenges associated with reducing operational load on document content retrieval server systems. For example, various embodiments of the present invention enable a document content retrieval server system to reduce the amount of content data associated with a document data object (e.g., an utterance data object) by summarizing the document data object, which in turn reduces the amount of content data that the document content retrieval server system transmits in response to document access requests. Accordingly, by providing techniques for reducing the amount of content data associated with a document data object by summarizing the document data object, various embodiments of the present invention address technical challenges associated with reducing operational load on document content retrieval server systems, and make important technical contributions to network architecture of document content retrieval server systems.

As further described below, various embodiments enable improved and accurate summarizations of a plurality of utterance data objects via generating one or more abstractive summary data objects using an encoder-decoder machine learning model and an attention graph data object. Abstractive summary data objects may holistically adapt and paraphrase the plurality of utterance data objects while retaining and accurately capturing significant information described within the utterance data objects and contextual relationships between the utterance data objects. The encoder-decoder machine learning model used in generating abstractive summary data objects may be configured and trained to encode and decode representations (e.g., party-agnostic representation data objects, party-wise representation data objects) of utterance data objects in a self-supervised or un-supervised manner. Accordingly, various embodiments provide various technical advantages, including improved summarization accuracy and obviation of historical training data.

Various example operations that may be performed to generate abstractive summarizations of a plurality of utterance data objects are now described. Some example embodiments of the present disclosure may be described in the example context of a utterance text data 400 of a conversation illustrated in FIG. 4A. As illustrated in FIG. 4A, the utterance text data 400 may involve multiple parties, and portions of the utterance text data 400 may be associated with multiple parties. In the illustrated embodiment, for example, the utterance text data 400 involves two parties 402, identified as Party A and Party B. In various examples, each party may represent a person that is communicating with other parties in an interaction, conversation, encounter, and/or the like. While FIG. 4A illustrates example utterance text data 400 involving two parties, it will be appreciated that various embodiments described herein for abstractive summarization of utterances can be applied to any interaction, conversation, encounter, and/or the like involving two or more parties.

As shown in FIG. 4A, the utterance text data 400 comprises a plurality of utterance data objects 404 that each include text (e.g., character-level tokens, word-level tokens, sentence-level tokens, special characters, formatting and spacing characters, and/or the like) representing utterances from a party 402. Each utterance data object 404 corresponds to and is associated with a party 402 of the plurality of parties involved in the interaction, conversation, encounter, and/or the like captured in the utterance text data 400. The utterances captured by the utterance data objects 404 may be spoken utterances by a party 402, written utterances by the party 402, electronically input utterances by the party 402, and/or the like. For instance, in various examples, the utterance text data 400 and the utterance data objects 404 may originate from an audio transcription system configured to transcribe auditory utterances into the utterance text data 400, from an optical character recognition system configured to recognize written utterances and generate the utterance text data 400, and/or the like. In such examples, the utterance text data 400 may include adaptation artifacts, such as stop words, transcription symbols (e.g., "\laughter"), and/or the like.

As discussed, various embodiments of the present disclosure provide for generation of abstractive summarizations of interactions, conversations, encounters, and/or the like captured in the utterance text data 400, for example. FIG. 4B illustrates two abstractive summary data objects 410 that may be generated in accordance with various embodiments described herein and that concisely adapt and paraphrase the utterance text data 400 of the illustrated embodiment of FIG. 4A. For instance, FIG. 4B depicts one abstractive summary data object 410 that concisely summarizes and adapts an utterance data object 404 associated with Party B describing a situation and an uttered reason for the conversation between Party A and Party B. FIG. 4B depicts another abstractive summary data object 410 that concisely summarizes and adapts utterance data objects 404 associated with Party A that detail Party A's response and contribution to the conversation. As can be recognized from FIGS. 4A and 4B, key information (e.g., a reason or cause for the conversation) from the utterance text data 400 is captured in the abstractive summary data objects 410, and utterance data objects 404 are adapted and paraphrased to form the abstractive summary data objects 410.

In various embodiments, an abstractive summary data object 410 may be generated for each party 402 (e.g., Party A and Party B); however, in some examples, the abstractive summary data objects 410 may be combined to form and/or may constitute one abstractive summarization. In various embodiments, generation of separate abstractive summary data objects for each party 402 enables further actions to be performed using the separate abstractive summary data objects. For instance, an abstractive summary data object 410 specific to a given party 402 may be stored with a profile for the given party 402, may be used to update the profile for the given party 402, and/or the like.

While FIG. 4B illustrates abstractive summary data objects 410 for the utterance text data 400 shown in FIG. 4A, FIG. 4C illustrates an extractive summary data object 420, which includes text data extracted from the utterance text data 400 that summarizes the utterance text data 400. As shown in FIG. 4C, an extractive summarization, such as an extractive summary data object 420, may include a greater amount of text data due to being limited to the language and textual content of the plurality of utterance data objects 404. That is, without the ability to adapt and paraphrase, generation of an extractive summarization such as the extractive summary data object 420 shown in FIG. 4C may result in a greater amount of summarization data, in various examples.

Further, with the extractive summary data object 420 including utterance data objects 404 extracted from the original utterance text data 400, the extractive summary data object 420 may feature various errors and/or artifacts without some post-processing operations being performed. For instance, in the first utterance data object 404 included within the extractive summary data object 420, repeated words (I'm I'm calling) may appear. Thus, in various examples, the extractive summary data object 420 may retain typological errors and/or artifacts, transcription errors and/or artifacts, recognition errors and/or artifacts, and/or the like as a result of extracting text from the original utterance text data 400.

In various embodiments of the present disclosure, the summarization system 101 may be configured to summarize an interaction, conversation, encounter, and/or the like by generating one or more abstractive summary data objects 410 and one or more extractive summary data objects 420. In some embodiments, the summarization system 101 may be instructed (e.g., via an API query or request) to summarize in an abstractive manner, in an extractive manner, or in both an abstractive and an extractive manner.

Having illustrated example abstractive summarizations and extractive summarizations of a plurality of utterance data objects 404 defining an interaction, conversation, encounter, and/or the like between a plurality of parties 402, a diagram 500 is illustrated in FIG. 5 and described in the context of example operations performed to summarize a plurality of utterance data objects 404 in at least an abstractive manner.

As shown in FIG. 5, an encoder-decoder machine learning model 510 and an attention graph data object 520 are used to generate one or more abstractive summary data objects 410 from a plurality of utterance data objects 404. In various embodiments, the utterance data objects 404 are provided to the encoder-decoder machine learning model 510 from which abstractive summary data objects 410 may be output. In generating and outputting abstractive summary data objects 410 with minimized loss of information content from the utterance data objects 404, the encoder-decoder machine learning model 510 may rely upon information represented by the attention graph data object 520. Thus, in various embodiments, the attention graph data object 520 may be generated according to semantic and party-wise relationships present in and among the utterance data objects 404, such that the attention graph data object 520 may be used with the encoder-decoder machine learning model in the abstractive summarization.

In various embodiments, an abstractive summary data object 410 may be generated by the encoder-decoder machine learning model 510 for each party 402; for instance, the illustrated embodiment depicts a first abstractive summary data object 410A generated for a first party 402A and a second abstractive summary data object 410B generated for a second party 402B. In order to generate party-specific abstractive summarizations, such as the first abstractive summary data object 410A and the second abstractive summary data object 410B, the utterance data objects 404 that define the interaction, conversation, encounter, and/or the like to be summarized may first be labeled and grouped according to their respective and associated party 402. In the illustrated embodiment, first utterance data objects 404A associated with the first party 402A and second utterance data objects 404B associated with the second party 402B are grouped and may be provided to the encoder-decoder machine learning model 510 to generate respective party-specific abstractive summarizations, in some embodiments. In one or more example embodiments, multiple encoder-decoder machine learning models 510 each configured, trained, and specific to a given party 402 may be used, and utterance data objects 404 may be provided to a respective encoder-decoder machine learning model 510, in some examples. In other embodiments including the illustrated embodiment, one encoder-decoder machine learning model 510 may be configured, trained, and used for utterance data objects 404 of all parties 402 to minimize overfitting the summarization task to a particular party 402.

As shown in FIG. 5, the encoder-decoder machine learning model 510 may be configured to, upon obtaining the plurality of utterance data objects 404, generate a party-agnostic representation data object 512 for each utterance data object 404. In particular, the party-agnostic representation data object 512 may represent and encode different portions of a corresponding utterance data object 404. For instance, a party-agnostic representation data object 512 may be a learned weighting of different word-level tokens within an utterance data object 404 within the context of the utterance data object 404. In some examples, the party-agnostic representation data object 512 may include a weighting of character-level tokens or otherwise-defined portions of the utterance data object 404.

In various embodiments, the encoder-decoder machine learning model 510 may include an encoder module configured and trained for the generation of party-agnostic representation data objects 512 for the utterance data objects 404. For example, the encoder module may be and/or may include a transformer encoder employing an attention and/or a self-attention mechanism. In other examples, the encoder-decoder machine learning model 510 may include one or more recurrent neural networks, long short-term memory units, bidirectional transformers, and/or the like configured to encode utterance-level information into party-agnostic representation data objects 512. As such, the encoder module or generally a portion of the encoder-decoder machine learning model 510 is configured and trained to determine a significance, contribution, importance, and/or the like of different portions of an utterance data object 404 and to generate a party-agnostic representation data object 512 accordingly. In various embodiments, the encoder-decoder machine learning model 510 may include one or more encoder modules configured to generate party-agnostic representation data objects 512 for the utterance data objects 404. In one or more example embodiments, for example, the encoder-decoder machine learning model 510 includes at least one encoder module (e.g., one or more transformer encoders) for each party 402 associated with the utterance data objects 404, and each encoder module may be configured to generate party-agnostic representation data objects 512 specific to a corresponding party 402 and/or based at least in part on domain knowledge specific to the corresponding party 402. In other example embodiments, one encoder module may be configured and trained to generate party-agnostic representation data objects 512 for utterance data objects 404 regardless of which party is associated with each utterance data object 404.

Accordingly, the encoder-decoder machine learning model 510 is configured and trained to generate party-agnostic representation data objects 512 for the utterance data objects 404, as illustrated in FIG. 5, and the party-agnostic representation data objects 512 capture and encode information found within each utterance data object 404. Hence, the party-agnostic representation data objects 512 may be agnostic to and may not necessarily encode information relating to party-wise relationships between utterance data objects 404. For instance, one utterance data object may directly correspond to and be a response to another utterance data object that is a query, within a holistic context of the interaction, conversation, encounter, and/or the like. Such party-wise and contextual relationships may be important in holistically understanding the utterance data objects 404 in order to generate abstractive summarizations (e.g., the abstractive summary data objects 410) of the utterance data objects 404.

Thus, as illustrated in FIG. 5, party-wise representations 514 for the utterance data objects 404 that capture inter-utterance and/or inter-party relationships between the utterance data objects 404 are generated, and in various embodiments, the party-wise representations 514 are generated using the attention graph data object 520. As discussed previously, the attention graph data object 520 may be generated and optimized to represent the relationships between utterance data objects 404 and inter-party dynamics.

An example of an attention graph data object 520 is illustrated in FIG. 6. As shown, the attention graph data object 520 generally exhibits a graphical structure and includes a plurality of nodes 602 and a plurality of edges 604 connecting the nodes 602. In various embodiments, each node 602 of the attention graph data object 520 represents an utterance data object 404 by one of two parties and an edge 604 represents a semantic relationship (e.g., question and answer) relationship between two utterance data objects 404.

Specifically, a node 602 of the attention graph data object 520 may include a party-agnostic representation data object 512 of an utterance data object 404. That is, a node 602 may represent an utterance data object 404 via its party-agnostic representation data object 512. Each node 602 of the attention graph data object 520 may be labeled to indicate the party associated with (e.g., uttering) the represented utterance data object. Returning to the illustrative and non-limiting example of a conversation between Party A and Party B, each node 602 is then labelled according to whether an utterance data object 404 is associated with either of Party A or Party B. In other examples, more than two parties 402 may be associated with the plurality of utterance data objects 404, and the nodes 602 may be labeled accordingly.

As in the illustrated embodiment, the attention graph data object 520 may be initialized to be a fully connected or a complete graph, with each utterance data object 404 initially assumed to be related to each other utterance data object 404. In various embodiments, each edge 604 is associated with one or more weights, parameters, and/or the like representing a strength of the relationship between two utterance data objects. The weights and/or parameters of the edges 604 of the attention graph data object 520 may be configured to then accurately represent different magnitudes of relationships between the utterance data objects 404 represented by the nodes 602.

In various embodiments, the weights and/or parameters of the edges 604 of the attention graph data object 520 may be automatically and intelligently configured to accurately represent relationships between utterance data objects 404. A graph neural network machine learning model, such as a graph convolutional neural network (gCNN), may be trained to learn semantic relationships between utterance data objects 404 and use the learned knowledge to modify and optimize the edge weights and parameters of the attention graph data object 520. In some example embodiments, the graph neural network machine learning model may be provided with historical ground-truth data for utterances with known relationships, and the graph neural network machine learning model may be trained via supervised and/or semi-supervised learning. Using the graph neural network machine learning model, the attention graph data object 520 may then be configured to accurately represent inter-utterance and/or inter-party relationships between the utterance data objects 404 (and between their corresponding party-agnostic representation data objects 512).

Returning to FIG. 5 and as previously described, party-wise representation data objects 514 that capture and encode inter-utterance and/or inter-party relationships between the utterance data objects 404 are generated using the attention graph data object 520. In various embodiments, the party-wise representation data objects 514 are generated from the party-agnostic representation data object 512 using graph attention via the attention graph data object 520. Accordingly, a party-wise representation data object 514 for a given utterance data object may include a weighting of one or more party-agnostic representation data objects 512 representing utterance data objects related to the given utterance data object as described by the attention graph data object 520.

In various embodiments, the encoder-decoder machine learning model 510 includes a decoder module that is configured to decode the party-wise representation data objects 514 to form reconstructed utterance data objects 504. The reconstructed utterance data objects 504 are predictions and approximations of the original utterance data objects in view of the semantic relationships and utterance-level importances encoded into the party-wise representation data objects 514. That is, the encoder-decoder machine learning model 510 learns and attempts to reconstruct or regenerate the original utterance data objects 404, or at least the semantic information thereof, provided to the encoder-decoder machine learning model 510 by decoding the party-wise representation data objects 514. In various embodiments, the encoder-decoder machine learning model 510 is configured and trained to regenerate the semantic information of the utterance data objects 404 according to certain pre-defined linguistic characteristics. For instance, the encoder-decoder machine learning model 510 is configured and trained to regenerate the semantic information of the utterance data objects 404 (via their party-wise representation data objects 514) in a third-person perspective, a first-person perspective, and/or the like. In various embodiments, the decoder module of the encoder-decoder machine learning model 510 includes one or more transformer decoders, one or more recurrent neural networks, one or more long short-term memory units, one or more bidirectional transformers, and/or the like configured to decode the party-wise representation data objects 514 to form reconstructed utterance data objects 504.

In various embodiments, the reconstructed utterance data objects 504 may be used to configure and train the encoder-decoder machine learning model 510, e.g., in a training pipeline or operation, and may be used to form abstractive summary data objects 410A, e.g., in an inference pipeline or operation. That is, the abstractive summary data objects 410A generated by the encoder-decoder machine learning model 510 include reconstructed utterance data objects 504. During training, the reconstructed utterance data objects 504 may be compared against the original utterance data objects provided to the encoder-decoder machine learning model 510, and according to a reconstruction loss measure generated to describe a similarity between the reconstructed utterance data objects 504 and the original utterance data objects (e.g., utterance data objects 404), various parameters, weights, biases, and/or the like of the encoder-decoder machine learning model 510 are modified and optimized.

In particular, with regenerative and auto-regressive training, the encoder-decoder machine learning model 510 can be trained without requiring historical labeled data; for example, the encoder-decoder machine learning model 510 is unsupervised and/or self-supervised. Of course, it should be understood that preparing historical labeled data for summarization tasks may be difficult, as a plurality of utterance data objects 404 may be accurately summarized via different summarizations; that is, there may not be a "ground-truth" summarization to be labelled and from which the encoder-decoder machine learning model 510 can learn. In any regard, with the encoder-decoder machine learning model 510 being unsupervised and/or self-supervised, various embodiments of the present disclosure provide technical advantages in requiring less training data and obviating a need to explicitly label training data.

Thus, in the training process of encoder-decoder machine learning model 510, a representation (e.g., a party-wise representation data object 514) of an utterance data object 404 is decoded, and the resulting decoded and reconstructed utterance data object 504 is compared against the utterance data object 404. During the training process, the encoder-decoder machine learning model 510 may not be aware of the original utterance data object to prevent biasing and overfitting of its encoding and decoding functions. For example, generally, the encoder-decoder machine learning model 510 may predict a particular utterance data object given other utterance data objects that may be related to the particular utterance data object, and the encoder-decoder machine learning model 510 evaluates the accuracy of its prediction once it becomes of the particular utterance data object after the prediction is generated.

For instance, during the training process, the encoder-decoder machine learning model 510 identifies a particular utterance data object that may be related to other utterance data objects. For instance, the particular utterance data object sequentially and directly follows the other utterance data objects, and the encoder-decoder machine learning model 510 is then tasked with next-utterance prediction. The other utterance data objects are encoded via party-agnostic representation data objects 512 and party-wise representation data objects 514. Using these representations of the other utterance data objects, the encoder-decoder machine learning model 510 generates a reconstructed utterance data object 504 corresponding to the particular utterance data object, and this generation of the reconstructed utterance data object 504 may not rely upon the particular utterance data object for representations thereof.

The reconstructed utterance data object 504 may then be compared to the particular utterance data object via a reconstruction loss measure. In various embodiments, the reconstruction loss measure may be defined according to Equation 1.

$$\mathcal{L}_{recon} = \frac{1}{n}\sum_{i=1}^{n}\left(\sum_{p=1}^{P} CE\left(e_p^{i+1}, e_p^{i+1}\right)\right) \qquad \text{Equation 1}$$

In Equation 1, p represents an index for the parties 402 associated with the plurality of utterance data objects 404, and P represents the total number of parties 402 associated with the plurality of utterance data objects 404. Meanwhile, n represents the total number of utterance data objects 404, with i serving as an index for the utterance data objects 404. As indicated in Equation 1, the similarity or lack thereof is determined for a succeeding utterance data object (e.g., indexed by i+1) that is predicted and re-generated when given the preceding utterance data objects. Precisely, in Equation 1, $\overline{e_p^{i+1}}$ represents a reconstructed utterance data object 504 and $e_p^{i+1}$ represents its corresponding utterance data object 404. In various embodiments, the similarity or lack thereof between $\overline{e_p^{i+1}}$ and $e_p^{i+1}$ is determined as a cross-entropy loss (e.g., CE in Equation 1); however, in other embodiments, cosine similarity values, mean square errors, hinge losses, divergence losses, Word Mover's Distance, and/or the like may be used.

In various embodiments, determination of the reconstruction loss measure may be followed by backpropagating the reconstruction loss measure throughout the encoder-decoder machine learning model 510 to modify and optimize various parameters, weights, biases, and/or the like thereof. Therefore, with the reconstruction loss measure, the encoder-decoder machine learning model 510 may be trained to accurately represent utterance data objects 404 and to decode representations of utterance data objects 404 while preserving their information content.

As previously discussed, the abstractive summary data objects 410 may include reconstructed utterance data objects 504 generated by the encoder-decoder machine learning model 510. In particular, the encoder-decoder machine learning model 510 is further trained to recognize significant party-wise representation data objects 514 and decode these significant party-wise representation data objects to form the abstractive summary data objects 410. Thus, the abstractive summary data objects 410 are formed from representations of a subset of the plurality of utterance data objects 404, and in various embodiments, the encoder-decoder machine learning model 510 is trained to recognize and select said subset.

In particular, the encoder-decoder machine learning model 510 may include an attention mechanism for selecting which party-wise representation data objects 514 are used to generate an abstractive summary data object 410. For instance, the attention mechanism may determine attention weights for different party-wise representation data objects 514 for a party 402, and party-wise representation data objects 514 having an attention weight satisfying a configurable and learned threshold are selected for decoding into the abstractive summary data object 410 for the party. As another example, the attention weights may be used to decode the different party-wise representation data objects 514 together in combination.

The attention mechanism of the encoder-decoder machine learning model 510 may be configured and trained also in an unsupervised and/or self-supervised manner. In various embodiments, the attention mechanism is configured and trained for generation of abstractive summary data objects 410 that are semantically similar to the original utterance data objects (e.g., utterance data objects 404A, 404B), and in doing so, various embodiments may include generating a summarization loss measure. In various embodiments, the summarization loss measure may quantify a semantic similarity between an abstractive summary data object 410 produced by the encoder-decoder machine learning model 510 and the utterance data objects 404 provided to the encoder-decoder machine learning model 510. In some example embodiments, the summarization loss measure may be defined according to Equation 2.

$$\mathcal{L}_{sum} = \frac{1}{n}\sum_{i=1}^{n}\left(d(e_A, e_a^i) + d(e_B, e_b^i)\right) \quad \text{Equation 2}$$

In Equation 2, $e_x$ and $e_y$ each represent an abstractive summary data object 410 generated for a party 402 (e.g., Party A, Party B). As indicated by Equation 2, the abstractive summary data object 410 may be compared to the utterance data objects 404 it summarizes. In some example embodiments, the abstractive summary data object 410 and an utterance data object 404 may be compared via a cosine similarity value (e.g., d in Equation 2); however, in other example embodiments, other measures including cross-entropy loss, Word Mover's Distance, mean square error, hinge losses, divergence losses, and/or the like may be used.

Using the summarization loss measure (e.g., $\mathcal{L}^{sum}$ in Equation 2), the attention mechanism may be trained to weight different utterances, or their representations, for abstractive summarization. In one example, important utterances and their corresponding representations may be weighted heavily via the trained attention mechanism, whereas relatively insignificant utterances (e.g., this is Reynell speaking in FIG. 4A) and their corresponding representations may be weighted less for summarization. In various embodiments, the summarization provided by the encoder-decoder machine learning model 510 via its decoding is associated with one or more configurable length constraints. The one or more configurable length constraints may be used to control a maximum size of the abstractive summary data objects 410 generated by the encoder-decoder machine learning model 510. In various embodiments, the one or more configurable length constraints may indicate a percentage of utterance data objects 404 and corresponding representations (e.g., party-wise representation data objects 514) that may be adapted and paraphrased via decoding to form abstractive summary data objects 410, a maximum number of word-level tokens for an abstractive summary data object 410, a maximum number of sentence-level tokens for an abstractive summary data object 410, and/or the like. In an example embodiment, the one or more configurable length constraints may constrain the abstractive summarization to 7.5% of the plurality of utterance data objects 404, 15% of the plurality of utterance data objects 404, 25% of the plurality of utterance data objects 404, and/or the like.

With the above, the encoder-decoder machine learning model 510 is trained and operated to summarize a plurality of utterance data objects 404 in at least an abstractive manner by generating one or more abstractive summary data objects 410. Referring now to FIG. 7, a flowchart diagram is provided to illustrate an example process 700 for summarizing a plurality of utterance data objects 404 in at least an abstractive manner by generating one or more abstractive summary data objects 410. In various embodiments, the system computing entity 106 comprises means, such as the processing elements 205, memory media 210, 215, network interface 220, and/or the like, for performing steps/operations of process 700 to generate one or more abstractive summary data objects 410.

Process 700 may begin with step/operation 701, at which a plurality of utterance data objects 404 are obtained, and the utterance data objects 404 define an interaction, a conversation, an encounter, and/or the like involving a plurality of parties 402. Each utterance data object 404 is associated with one party 402. In various embodiments, the utterance data objects 404 comprise text data generated from audio transcription, optical character recognition, manual user input, and/or the like.

Process 700 include step/operation 702, at which a party-agnostic representation data object 512 for each utterance data object 404 is generated using an encoder-decoder machine learning model 510. As discussed, the party-agnostic representation data object 512 includes an encoding of information within the context of the utterance data object 404; that is, the party-agnostic representation data object 512 may be an utterance-level encoding that weights different word-level tokens, sentence-level tokens, and/or the like within the utterance data object 404. As such, the party-agnostic representation data object 512 may be agnostic to the party that is associated with the utterance data object 404 and to the relationships between the utterance data object 404 with other utterance data objects, in various examples. In various embodiments, the party-agnostic representation data object 512 for each utterance data object 404 is generated via one or more self-attention mechanisms, one or more transformer encoders, one or more recurrent neural networks, one or more long short-term memory units, and/or the like within the encoder-decoder machine learning model 510.

Process 700 includes step/operation 703, at which an attention graph data object 520 is generated, and the attention graph data object 520 is configured to represent semantic and party-wise (e.g., cross-party) relationships between the utterance data objects 404. For instance, the attention graph data object 520 may be generated and optimized to represent a question-and-answer relationships between two given utterance data objects, to represent a lack of meaningful relationships between two given utterance data objects (e.g., this is Reynell speaking and no no just United Healthcare in the illustrated example of FIG. 4A), and/or the like. In various embodiments, the attention graph data object 520 includes a plurality of nodes 602 which may each correspond to an utterance data object 404 and may comprise its party-agnostic representation data object 512. The attention graph data object 520 further includes a plurality of edges 604 connecting the nodes 602 and weighting the relationships between the represented utterance data objects. In various embodiments, the attention graph data object 520 may be initialized to represent fully connected relationships between the utterance data objects 404, and the attention graph data object 520 may be optimized (e.g., iteratively) using a graph neural network machine learning model trained to learn and recognize relationships between utterance data objects 404, or between their party-agnostic representation data objects 512.

Process 700 includes step/operation 704, at which the party-wise representation data objects 514 for each utterance data object 404 may be generated. In particular, the party-wise representation data object 514 for an utterance data object 404 is generated from the party-agnostic representation data object 512 and the attention graph data object 520. The semantic and party-wise relationship information represented by the attention graph data object 520 is used to supplement the party-agnostic representation data object 512 and form the party-wise representation data object 514 for an utterance data object 404. In various embodiments, graph attention is used to weight different party-agnostic representation data objects 512 to form the party-wise representation data object 514 for the utterance data object 404. Accordingly, the party-wise representation data object 514 for an utterance data object 404 encodes both utterance-level and inter-utterance information for the utterance data object 404, in various embodiments.

Process 700 includes step/operation 705, at which a subset of party-wise representation data objects 514 are selected and/or identified for summarization. In some example embodiments, a subset of party-wise representation data objects 514 is selected and/or identified for each party 402, such that each party's contribution to the interaction, conversation, encounter, and/or the like can each be summarized. In various embodiments, the subset of party-wise representation data objects 514 may be selected and/or identified using an attention mechanism of the encoder-decoder machine learning model, and the attention mechanisms may be trained to identify party-wise representation data objects 514 that include significant information from the interaction, conversation, encounter, and/or the like. In particular, the attention mechanism may be trained using a summarization loss measure that represents a semantic similarity between an abstractive summary data object 410 and a plurality of utterance data objects 404. In some embodiments, each party-wise representation data object 514 may be assigned with an attention weight indicating a contribution of the party-wise representation data object 514 to the production of an abstractive summary data object 410.

Process 700 includes step/operation 706, at which the party-wise representation data objects 514 are decoded to generate one or more abstractive summary data objects 410. In various embodiments, the subset of party-wise representation data objects 514 is decoded to generate an abstractive summary data objects 410. In other example embodiments, a subset of party-wise representation data objects 514 for each party 402 is decoded to generate an abstractive summary data object 410 for each party 402. In various embodiments, the party-wise representation data objects 514 are decoded by the encoder-decoder machine learning model 510; for example, the encoder-decoder machine learning model includes one or more transformer decoders, one or more recurrent neural networks, one or more long short-term memory units, and/or the like configured to decode party-wise representation data objects 514. The decoding of a particular party-wise representation data object may involve processing and decoding of other related party-wise representation data objects (e.g., within the same subset). In various embodiments, the encoder-decoder machine learning model 510 is trained to decode representations (e.g., party-wise representation data objects 514) of utterance data objects 404 into reconstructed utterance data objects 504 in an unsupervised and/or self-supervised manner. For instance, the decoding function of the encoder-decoder machine learning model 510 is trained using a reconstruction loss measure (e.g., defined according to Equation 2) that represents a similarity between the reconstructed utterance data objects 504 and the utterance data objects 404. Thus, with step/operation 706, one or more abstractive summary data objects 410 are generated for the plurality of utterance data objects 404 with minimized loss of and/or departure from significant semantic information in the utterance data objects 404, and the encoder-decoder machine learning model 510 can be trained to generate the one or more abstractive summary data objects 410 without historical labeled data and in an unsupervised and/or self-supervised manner.

In some embodiments, extractive summary data objects 420 may also be generated. For instance, the subset of party-wise representation data objects 514 may be used to reference and identify a subset of the utterance data objects 404, as the party-wise representation data objects 514 correspond to the utterance data objects 404. The subset of the utterance data objects 404 may then be used to form one or more extractive summary data objects 420. In various embodiments, the abstractive summary data objects 410 and the extractive summary data objects 420 may together provide summarizations of the interaction, conversation, encounter, and/or the like defined by the plurality of utterance data objects 404.

Process 700 includes step/operation 707, at which one or more automated actions may be performed based at least in part on the one or more abstractive summary data objects 410. In various embodiments, the automated actions may include provisioning and configuring of a post-summarization system, such as a system configured to profile each party 402 according to their respective abstractive summary data objects 410, or a system configured to perform processing actions according to the content of the abstractive summary data objects 410. Returning to the example conversation captured in FIG. 4A, a post-summarization system may automatically update primary insurance information in response to detecting the problem related to primary insurance information in the utterance text data 400, for example. That is, certain actions for a post-summarization system may be automatically performed based at least in part on an analysis of the one or more abstractive summary data objects 410. Accordingly, abstractive summarization provided by various embodiments described herein improve the efficiency and operational throughput of such post-summarization systems, as such systems may analyze more concise summaries in alternative to the utterance text data 400 in its entirety.

In various embodiments, other automated actions may include providing the abstractive summary data objects 410 for display, such as for a party 402 to read and confirm. Upon display of the abstractive summary data objects 410, the parties 402 may provide feedback, and such feedback may be used to further configure and train the encoder-decoder machine learning model 510, the graph neural network machine learning model for optimizing the attention graph data object 520, and/or the like.

Other examples of automated actions include performing operational load balancing operations for post-prediction systems. For example, various embodiments of the present invention make important technical contributions to improving resource-usage efficiency of post-prediction systems (e.g., summarization-based predictive data analysis systems that analyze summarization data) by using document (e.g., utterance) to set the number of allowed computing entities used by the noted post-prediction systems. For example, in some embodiments, a predictive data analysis computing entity determines D investigation classifications for D document data objects based at least in part on the D summarizations for the D document data objects. Then, the count of document data objects that are associated with an affirmative investigation classification, along with a resource utilization ratio for each document data object, can be used to predict a predicted number of computing entities needed to perform post-prediction processing operations (e.g., automated investigation operations) with respect to the D document data objects. For example, in some embodiments, the number of computing entities needed to perform post-prediction processing operations (e.g., automated investigation operations) with respect to D document data objects can be determined based at least in part on the output of the equation: $R = \text{ceil}(\Sigma_k^{k=K} ur_k)$, where R is the predicted number of computing entities needed to perform post-prediction processing operations with respect to the D document data object, ceil(·) is a ceiling function that returns the closest integer that is greater than or equal to the value provided as the input parameter of the ceiling function, k is an index variable that iterates over K document data objects among the D document data that are associated with affirmative investigative classifications, and $ur_k$ is the estimated resource utilization ratio for a kth document data object that may be determined based at least in part on a count of utterances/tokens/words in the kth document data object. In some embodiments, once R is generated, the predictive data analysis computing entity can use R to perform operational load balancing for a server system that is configured to perform post-prediction processing operations (e.g., automated investigation operations) with respect to D document data objects. This may be done by allocating computing entities to the post-prediction processing operations if the number of currently-allocated computing entities is below R, and deallocating currently-allocated computing entities if the number of currently-allocated computing entities is above R.

Therefore, various embodiments described herein provide technical advantages and improvements in summarizing an interaction, conversation, encounter, and/or the like in at least an abstractive manner. In particular, various embodiments enable generation of abstractive summarizations that summarize utterances with conciseness and improved data and size efficiency compared to extractive summarizations. Further, various embodiments provide reliable and improved accuracy in abstractive summarization, with the use of an encoder-decoder machine learning model and an attention graph data object that together enable both utterance-level, inter-utterance, and inter-party relationships to be captured, encoded, and used in the abstractive summarization.

Moreover, as described above, various embodiments of the present invention address technical challenges associated with reducing operational load on document content retrieval server systems. For example, various embodiments of the present invention enable a document content retrieval server system to reduce the amount of content data associated with a document data object (e.g., an utterance data object) by summarizing the document data object, which in turn reduces the amount of content data that the document content retrieval server system transmits in response to document access requests. Accordingly, by providing techniques for reducing the amount of content data associated with a document data object by summarizing the document data object, various embodiments of the present invention address technical challenges associated with reducing operational load on document content retrieval server systems, and make important technical contributions to network architecture of document content retrieval server systems.

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be That which is claimed:

1. A computer-implemented method comprising:
generating, by one or more processors and using an encoder-decoder machine learning model, a party-agnostic representation data object based at least in part on an utterance data object of a plurality of utterance data objects, wherein the encoder-decoder machine learning model is configured to identify one or more semantic relationships between the utterance data object and one or more related utterance data objects of the plurality of utterance data objects;
generating, by the one or more processors and based at least in part on the party-agnostic representation data object, an attention graph data object that encodes the one or more semantic relationships between the utterance data object and the one or more related utterance data objects;
modifying, by the one or more processors and using the attention graph data object, the party-agnostic representation data object to generate a party-wise representation data object that incorporates semantic relationship data associated with the one or more semantic relationships;
generating, by the one or more processors and using the encoder-decoder machine learning model, an abstractive summary data object based at least in part on the party-wise representation data object, wherein the abstractive summary data object comprises a prediction, of the utterance data object, that is generated based at least in part on the party-wise representation data object and one or more party-wise representation data objects corresponding to the one or more related utterance data objects; and
initiating, by the one or more processors, one or more automated actions based at least in part on the abstractive summary data object.

2. The computer-implemented method of claim 1, wherein the encoder-decoder machine learning model is configured to (a) generate the party-agnostic representation data object for the utterance data object and (b) decode the one or more party-wise representation data objects by:
generating a reconstruction loss measure from the prediction and the particular utterance data object; and
configuring one or more parameters of the encoder-decoder machine learning model based at least in part on the reconstruction loss measure.

3. The computer-implemented method of claim 1, further comprising configuring the encoder-decoder machine learning model by generating a summarization loss measure between a plurality of abstractive summary data objects and the plurality of utterance data objects.

4. The computer-implemented method of claim 3, wherein the summarization loss measure comprises a mean cosine similarity score.

5. The computer-implemented method of claim 1, wherein a subset of the one or more party-wise representation data objects is selected using an attention mechanism of the encoder-decoder machine learning model.

6. The computer-implemented method of claim 1, wherein a subset of the one or more party-wise representation data objects is selected according to a configurable length constraint associated with a corresponding party of a plurality of parties.

7. The computer-implemented method of claim 1, wherein the attention graph data object is generated by iteratively optimizing the attention graph data object using a graph neural network machine learning model.

8. The computer-implemented method of claim 1, further comprising generating an extractive summary data object from a subset of the plurality of utterance data objects based at least in part on a subset of the one or more party-wise representation data objects.

9. The computer-implemented method of claim 1, wherein the one or more automated actions comprises automatically associating the abstractive summary data object with a profile data object corresponding to a party associated with the abstractive summary data object.

10. A system comprising memory and one or more processors communicatively coupled to the memory, the one or more processors configured to:
generate, using an encoder-decoder machine learning model a party-agnostic representation data object based at least in part on an utterance data object of a plurality of utterance data objects, wherein the encoder-decoder machine learning model is configured to identify one or more semantic relationships between the utterance data object and one or more related utterance data objects of the plurality of utterance data objects;
generate, based at least in part on the party-agnostic representation data object, an attention graph data object that encodes the one or more semantic relationships between the utterance data object and the one or more related utterance data objects;
modify, using the attention graph data object, the party-agnostic representation data object to generate a party-wise representation data object that incorporates semantic relationship data associated with the one or more semantic relationships;
generate, using the encoder-decoder machine learning model, an abstractive summary data object based at least in part on the party-wise representation data object, wherein the abstractive summary data object includes a prediction, of the utterance data object, that is generated based at least in part on the party-wise representation data object and one or more party-wise representation data objects corresponding to the one or more related utterance data objects; and
initiate one or more automated actions based at least in part on the abstractive summary data object.

11. The system of claim 10, wherein the encoder-decoder machine learning model is configured to (a) generate the party-agnostic representation data object for the utterance data object and (b) decode the one or more party-wise representation data objects by:
generating a reconstruction loss measure from the prediction and the particular utterance data object; and
configuring one or more parameters of the encoder-decoder machine learning model based at least in part on the reconstruction loss measure.

12. The system of claim 10, wherein the one or more processors are further configured to configure the encoder-decoder machine learning model based at least in part on generating a summarization loss measure between a plurality of abstractive summary data objects and the plurality of utterance data objects.

13. The system of claim 12, wherein the summarization loss measure comprises a mean cosine similarity score.

14. The system of claim 10, wherein a subset of the one or more party-wise representation data objects is selected using an attention mechanism of the encoder-decoder machine learning model.

15. The system of claim 10, wherein a subset of the one or more party-wise representation data objects is selected according to a configurable length constraint associated with a corresponding party of a plurality of parties.

16. The system of claim 10, wherein the attention graph data object is generated based at least in part on iteratively optimizing the attention graph data object using a graph neural network machine learning model.

17. The system of claim 10, wherein the one or more processors are further configured to generate an extractive summary data object from a subset of the plurality of utterance data objects based at least in part on a subset of the one or more party-wise representation data objects.

18. The system of claim 10, wherein the one or more automated actions comprises automatically associating the abstractive summary data object with a profile data object corresponding to a party associated with the abstractive summary data object.

19. One or more non-transitory computer-readable storage media including instructions that, when executed by one or more processors, cause the one or more processors to:
generate, using an encoder-decoder machine learning model a party-agnostic representation data object based at least in part on an utterance data object of a plurality of utterance data objects, wherein the encoder-decoder machine learning model is configured to identify one or more semantic relationships between the utterance data object and one or more related utterance data objects of the plurality of utterance data objects;
generate, based at least in part on the party-agnostic representation data object, an attention graph data object that encodes the one or more semantic relationships between the utterance data object and the one or more related utterance data objects;
modify, using the attention graph data object, the party-agnostic representation data object to generate a party-wise representation data object that incorporates semantic relationship data associated with the one or more semantic relationships;
generate, using the encoder-decoder machine learning model, an abstractive summary data object based at least in part on the party-wise representation data object, wherein the abstractive summary data object includes a prediction, of the utterance data object, that is generated based at least in part on the party-wise representation data object and one or more party-wise representation data objects corresponding to the one or more related utterance data objects; and
initiate one or more automated actions based at least in part on the abstractive summary data object.

20. The one or more non-transitory computer-readable storage media of claim 19, wherein the encoder-decoder machine learning model is configured to (a) generate the party-agnostic representation data object for the utterance data object and (b) decode party-wise representation data objects by:
generating a reconstruction loss measure from the prediction and the particular utterance data object; and
configuring one or more parameters of the encoder-decoder machine learning model based at least in part on the reconstruction loss measure.

* * * * *

UNITED STATES PATENT AND TRADEMARK OFFICE
CERTIFICATE OF CORRECTION

PATENT NO. : 12,210,818 B2
APPLICATION NO. : 17/734655
DATED : January 28, 2025
INVENTOR(S) : Suman Roy et al.

Page 1 of 1

It is certified that error appears in the above-identified patent and that said Letters Patent is hereby corrected as shown below:

In the Claims

In Column 32, Line 56, Claim 11, delete "the particular" and insert -- the --, therefor.

Signed and Sealed this
Fifteenth Day of April, 2025

Coke Morgan Stewart
*Acting Director of the United States Patent and Trademark Office*